US008554455B2

(12) United States Patent
Miyazato et al.

(10) Patent No.: US 8,554,455 B2
(45) Date of Patent: Oct. 8, 2013

(54) CONTROL APPARATUS FOR INTERNAL COMBUSTION ENGINE

(75) Inventors: Yoshiaki Miyazato, Toyota (JP); Toshio Imamura, Okazaki (JP); Yuu Yokoyama, Okazaki (JP); Satoshi Yoshi, Toyota (JP); Yoshiki Endo, Toyota (JP); Yuu Ueda, Toyota (JP); Hiroyuki Ishii, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/262,871

(22) PCT Filed: Aug. 25, 2010

(86) PCT No.: PCT/JP2010/064419
§ 371 (c)(1),
(2), (4) Date: Oct. 4, 2011

(87) PCT Pub. No.: WO2012/026010
PCT Pub. Date: Mar. 1, 2012

(65) Prior Publication Data
US 2013/0152887 A1    Jun. 20, 2013

(51) Int. Cl.
*F01L 1/344*    (2006.01)
*F02D 13/02*    (2006.01)

(52) U.S. Cl.
USPC .................. 701/114; 123/90.15; 123/347

(58) Field of Classification Search
USPC ............ 701/114, 102, 115; 123/90.15, 90.12, 123/90.13, 90.17, 90.18, 90.31, 345–348
See application file for complete search history.

(56) References Cited

U.S. PATENT DOCUMENTS

| 6,330,870 B1 * | 12/2001 | Inoue et al. ................. 123/90.17 |
| 7,789,051 B2 * | 9/2010 | Nakamura ................. 123/90.15 |
| 2003/0121486 A1 | 7/2003 | Komazawa et al. |
| 2006/0102125 A1 | 5/2006 | Mashiki |
| 2006/0102127 A1 | 5/2006 | Izumi et al. |
| 2007/0251481 A1 | 11/2007 | Izumi et al. |
| 2008/0109149 A1 | 5/2008 | Magarida et al. |

FOREIGN PATENT DOCUMENTS

| EP | 1 903 199 A1 | 3/2008 |
| JP | A-2000-073795 | 3/2000 |
| JP | A-2000-213383 | 8/2000 |
| JP | A-2005-233174 | 9/2005 |

(Continued)

OTHER PUBLICATIONS

Jan. 4, 2012 Notice of Allowance issued in Japanese Patent Application No. 2011-541420 (with translation).

(Continued)

*Primary Examiner* — Hieu T Vo
(74) *Attorney, Agent, or Firm* — Oliff & Berridge, PLC (57) ABSTRACT

An IIS system that performs control related to intermittent stopping of engine operation by idling stop control is applied to an internal combustion engine including a VVT mechanism that makes the valve timing of an engine valve variable and has an intermediate lock mechanism that mechanically locks the valve timing at an intermediate lock position between a most retarded position and a most advanced position. The IIS system is configured to inhibit the engine operation from being intermittently stopped at the occurrence of a failure of the VVT mechanism to avoid the internal combustion engine from being prevented from being restarted after the intermittent stop depending on the occurrence of the failure of the VVT mechanism.

8 Claims, 5 Drawing Sheets

(56) References Cited

FOREIGN PATENT DOCUMENTS

| | | |
|---|---|---|
| JP | A-2006-138299 | 6/2006 |
| JP | A-2006-144567 | 6/2006 |
| JP | B2-3867897 | 1/2007 |
| JP | A-2007-64127 | 3/2007 |
| JP | A-2008-190495 | 8/2008 |
| JP | A-2009-74379 | 4/2009 |
| JP | A-2009-156219 | 7/2009 |
| JP | A-2009-202662 | 9/2009 |
| JP | A-2010-31702 | 2/2010 |
| JP | A-2010-48194 | 3/2010 |
| JP | 2011179418 A * | 9/2011 |

OTHER PUBLICATIONS

International Search Report issued in Japanese Patent Application No. PCT/JP2010/064419 dated Nov. 22, 2010 (with translation).

* cited by examiner

CONTROL APPARATUS FOR INTERNAL COMBUSTION ENGINE

TECHNICAL FIELD

The present invention relates to a control apparatus that is applied to an internal combustion engine including a variable valve timing mechanism having an intermediate locking mechanism that mechanically locks valve timing at an intermediate lock position between a most retarded position and a most advanced position, the control apparatus intermittently stopping an operation of the mechanism.

BACKGROUND ART

As a mechanism applied to an internal combustion engine for a vehicle or the like, a variable valve timing mechanism is known that makes valve timing of an engine valve variable. As a kind of variable valve timing mechanism, a hydraulic variable valve timing mechanism operating by hydraulic pressure is in practical use.

The hydraulic variable valve timing mechanism is operated such that hydraulic pressure supplied from a hydraulic pump driven by rotation of the engine is adjusted by an oil control valve. For this reason, at engine start when an oil pump begins to operate, the hydraulic variable valve timing mechanism may not receive hydraulic pressure sufficient to hold the valve timing. For this reason, in a large number of hydraulic variable valve timing mechanisms, lock mechanisms are installed that mechanically lock valve timings without the use of hydraulic pressure.

In a variable valve timing mechanism for intake valves, in general, locking of valve timing by a lock mechanism is performed at a most retarded position. On the other hand, in recent years, a variable valve timing mechanism that realizes an Atkinson cycle by considerably retarding the valve timing of an intake valve and late-closing intake valves has also been proposed. In the variable valve timing mechanism in which a variable range of valve timing is widened on the retarded side, a sufficient compression ratio cannot be obtained at the most retarded position, and an internal combustion engine cannot exhibit good startability. In such a variable valve timing mechanism, an intermediate lock mechanism that mechanically locks valve timing at an intermediate lock position between the most retarded position and the most advanced position is installed to set the valve timing at engine start to the intermediate lock position.

On the other hand, in recent years, a vehicle that executes idling stop control has been in practical use to automatically stop an internal combustion engine during vehicle stoppages such as waits at stoplights. In a hybrid vehicle, in an operation region in which the fuel efficiency of an internal combustion engine is low, the internal combustion engine is stopped so that driving is performed by a motor. For this reason, the internal combustion engine mounted on the vehicle is intermittently stopped while the vehicle is moving.

Conventionally, Patent Document 1 discloses that, in a hybrid vehicle including a variable valve timing mechanism, valve timing is set at the most retarded position when an internal combustion engine is intermittently stopped. Patent Document 2 discloses that, in an internal combustion engine including a variable valve timing mechanism with an intermediate lock mechanism, the valve timing is retarded from an intermediate lock position at an intermittent stop, and the valve timing is set at the intermediate lock position when stopping the engine normally by turning off the ignition switch.

PRIOR ART DOCUMENTS

Patent Documents

Patent Document 1: Japanese Laid-Open Patent Publication No. 2000-213383
Patent Document 2: Japanese Laid-Open Patent Publication No. 2007-064127

SUMMARY OF THE INVENTION

During operation of an internal combustion engine, a failure (breakdown) may occur of a variable valve timing mechanism such as sticking of movable members serving as constituent elements of the variable valve timing mechanism or disconnection of a control line extending from an oil control valve. When such a failure occurs, the valve timing cannot be controlled exactly as intended, and the valve timing at the restart of the internal combustion engine after an intermittent stop may be an inappropriate valve timing at engine start. As a result, the internal combustion engine may not be able to be restarted after an intermittent stop.

The present invention has been made in consideration of the above circumstances, and its objective is to provide a control apparatus for an internal combustion engine that avoids the internal combustion engine from being prevented from being restarted after an intermittent stop due to occurrence of a failure of a variable valve timing mechanism with an intermediate lock mechanism.

Means for Solving the Problems

A first aspect of the present invention is based on a control apparatus that is applied to an internal combustion engine including a variable valve timing mechanism that makes valve timing of an engine valve variable and has an intermediate lock mechanism that mechanically locks the valve timing at an intermediate lock position between a most retarded position and a most advanced position, and intermittently stops operation of the engine. In order to achieve the above object, the control apparatus for an internal combustion engine according to the first aspect of the present invention includes an inhibiting means that inhibits the engine from being intermittently stopped at the occurrence of a failure of the variable valve timing mechanism.

When a failure occurs in the variable valve timing mechanism, the valve timing may be retarded with respect to the intermediate lock position at restart of the internal combustion engine after an intermittent stop. In such a case, a sufficient compression ratio cannot be obtained, and the internal combustion engine may be difficult to restart. In this regard, in the first aspect of the present invention, at the occurrence of a failure of the variable valve timing mechanism, the engine is inhibited from being intermittently stopped. For this reason, the internal combustion engine is avoided from being prevented from being restarted after the intermittent stop due to the occurrence of a failure of the variable valve timing mechanism with an intermediate lock mechanism.

A second aspect of the present invention is based on a control apparatus that is applied to an internal combustion engine including a variable valve timing mechanism that makes a valve timing of an engine valve variable and has an intermediate lock mechanism that mechanically locks the valve timing at an intermediate lock position between a most retarded position and a most advanced position, and intermittently stops operation of the engine. In order to achieve the above object, in the second aspect of the present invention, the control apparatus may include an inhibiting means that inhibits the engine from being intermittently stopped when a failure of the variable valve timing mechanism occurs to limit the operation range of the variable valve timing mechanism to a range on the retarded side thereof with respect to the intermediate lock position.

When the failure occurs, the valve timing is retarded with respect to the intermediate lock position at a restart of the internal combustion engine after an intermittent stop, and the internal combustion engine may be difficult to restart. In this regard, in the second aspect of the present invention, operation of the engine is inhibited from being intermittently stopped at the occurrence of a failure. For this reason, the internal combustion engine can be avoided from being prevented from being restarted after an intermittent stop due to occurrence of a failure of the variable valve timing mechanism with an intermediate lock mechanism.

Even at the occurrence of a failure of the variable valve timing mechanism, depending on circumstances, the internal combustion engine may exhibit good startability. At the occurrence of the failure, therefore, when good restartability of the engine is exhibited, the inhibiting means may be configured not to inhibit an intermittent stop. In this manner, the operation of the engine is not unnecessarily inhibited from being intermittently stopped, and effective improvement of the fuel efficiency by executing intermittent stopping can be maintained.

At the occurrence of a failure of the variable valve timing mechanism, depending on types of failures, the internal combustion engine may exhibit good startability. For example, when actuation of the intermediate lock mechanism is kept non-cancelable, the valve timing is set at an intermediate lock position. For this reason, the good startability of the internal combustion engine can be maintained. Therefore, at the occurrence of a failure, the inhibiting means may be configured to select whether to inhibit intermittent stopping depending on the type of failure. In this manner, the operation of the engine is not unnecessarily inhibited from being intermittently stopped, and effective improvement of the fuel efficiency by executing intermittent stopping can be maintained.

At the occurrence of a failure of the variable valve timing mechanism, depending on the engine operation state at the time, the internal combustion engine may exhibit good startability. For example, when the engine temperature is sufficiently high, even though the valve timing is retarded from the intermediate lock position, good startability of the internal combustion engine can be exhibited. Therefore, at the occurrence of a failure, the inhibiting means may be configured to select whether to inhibit intermittent stopping depending on the operation status of the engine. In this manner, the operation of the engine is not unnecessarily inhibited from being intermittently stopped, and effective improvement of the fuel efficiency by executing intermittent stopping can be maintained.

Even though a failure occurs in the variable valve timing mechanism, if the failure occurs in unlocking of the intermediate lock mechanism, the valve timing is at the intermediate lock position. For this reason, good startability of the internal combustion engine can be maintained. At the occurrence of a failure, therefore, if the failure occurs in unlocking of the intermediate lock mechanism, the inhibiting means may be configured not to inhibit the engine from being intermittently stopped. In this manner, operation of the engine is not unnecessarily inhibited from being intermittently stopped, and effective improvement in mileage by executing an intermittent stopping can be maintained.

When the engine temperature is sufficiently high, even though the valve timing is retarded with respect to the intermediate lock position, the internal combustion engine can exhibit good startability. For this reason, when the engine temperature is higher than a specific determination value at the occurrence of a failure, the inhibiting means may be configured not to inhibit the engine from being intermittently stopped. In this manner, operation of the engine is not unnecessarily inhibited from being intermittently stopped, and effective improvement of the fuel efficiency by executing intermittent stopping can be maintained. The determination value used at the time can be set as a temperature higher than the minimum engine temperature at which intermittent stopping is permitted to be executed.

Even though a failure occurs in the variable valve timing mechanism, when a sufficient period of time has elapsed after the engine is started to cause the engine to sufficiently warm up, the internal combustion engine can exhibit good startability even though the valve timing is retarded with respect to the intermediate lock position. For this reason, the inhibiting means may be configured to inhibit the engine from being intermittently stopped until elapse of a specific time after the engine is started. In this manner, the operation of the engine is not unnecessarily inhibited from being intermittently stopped, and effective improvement in fuel efficiency by executing intermittent stopping can be maintained.

DETAILED DESCRIPTION OF THE PREFERRED EMBODIMENTS

First Embodiment

A control apparatus for an internal combustion engine according to a first embodiment of the present invention will be described below with reference to FIGS. 1 to 4. The control apparatus according to the present invention performs "idling stop control" that automatically stops the internal combustion engine during vehicle stoppages such as waiting at stoplights.

In the present embodiment, with the idling stop control, the internal combustion engine is intermittently stopped during operation of the vehicle.

Figure 1:
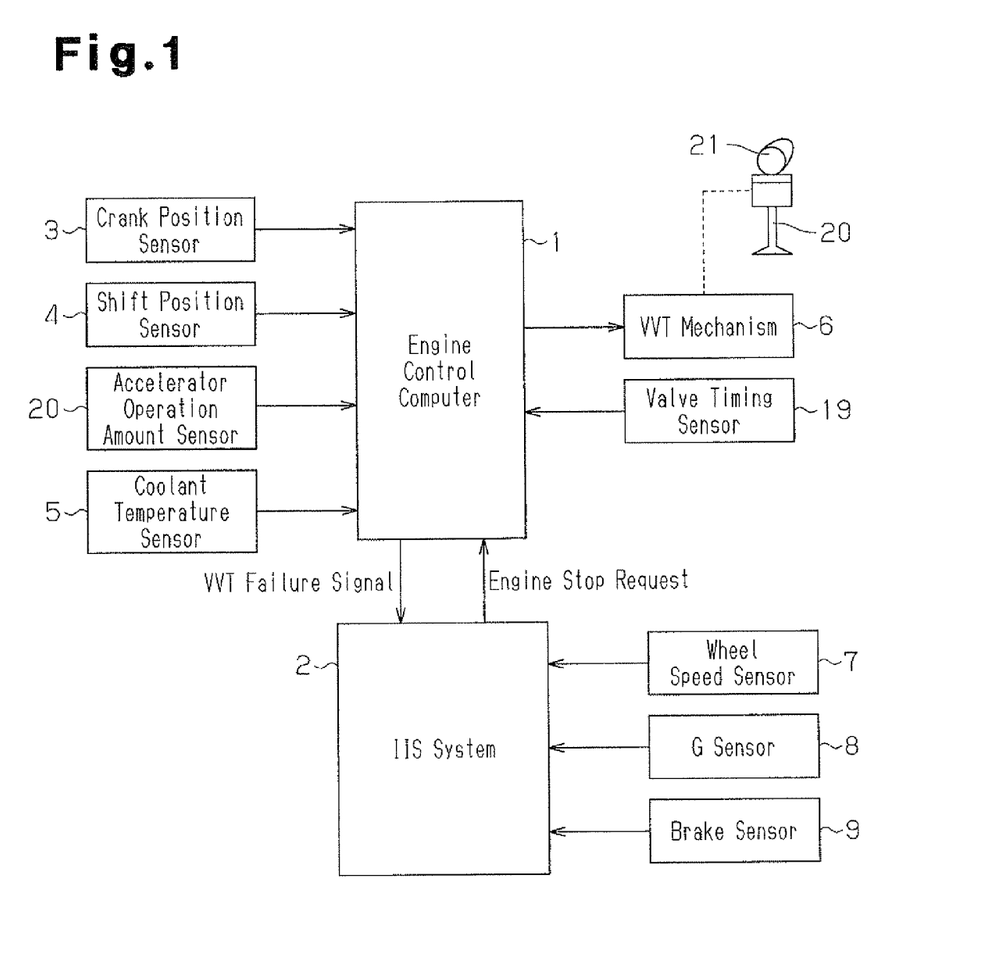
FIG. 1 is a schematic diagram showing the entire configuration of a first embodiment of the present invention.

FIG. 1 shows the entire configuration of the present embodiment. As shown in FIG. 1, the control apparatus for an internal combustion engine according to the present embodiment includes an engine control computer 1 that executes engine control and an IIS (Intelligent Idling Stop) system 2 that executes idling stop control.

The engine control computer 1 receives detection signals of a crank position sensor 3 that detects a rotational phase of a crankshaft serving as an engine output shaft, a shift position sensor 4 that detects the operation position of a shift lever, an accelerator operation amount sensor 20 that detects the operation amount of an accelerator pedal, a coolant temperature sensor 5 that detects the temperature of engine coolant. The engine control computer 1 executes engine control and throttle control. The engine control computer 1 executes, as a part of engine control, control of a variable valve timing mechanism 6 (to be referred to as a VVT mechanism 6 hereinafter) that makes the valve timing of an intake valve 20 variable.

On the other hand, the IIS system 2 receives detection signals from a wheel speed sensor 7 that detects rotational speed of a wheel, a G sensor 8 that detects acceleration acting on a vehicle body, and a brake sensor 9 that detects the operational position of a brake pedal. The IIS system 2 determines, on the basis of detection results of the sensors, whether an idling stop execution condition is established and outputs an engine stop request to the engine control computer 1 depending on the establishment of the execution condition.

Figure 2:
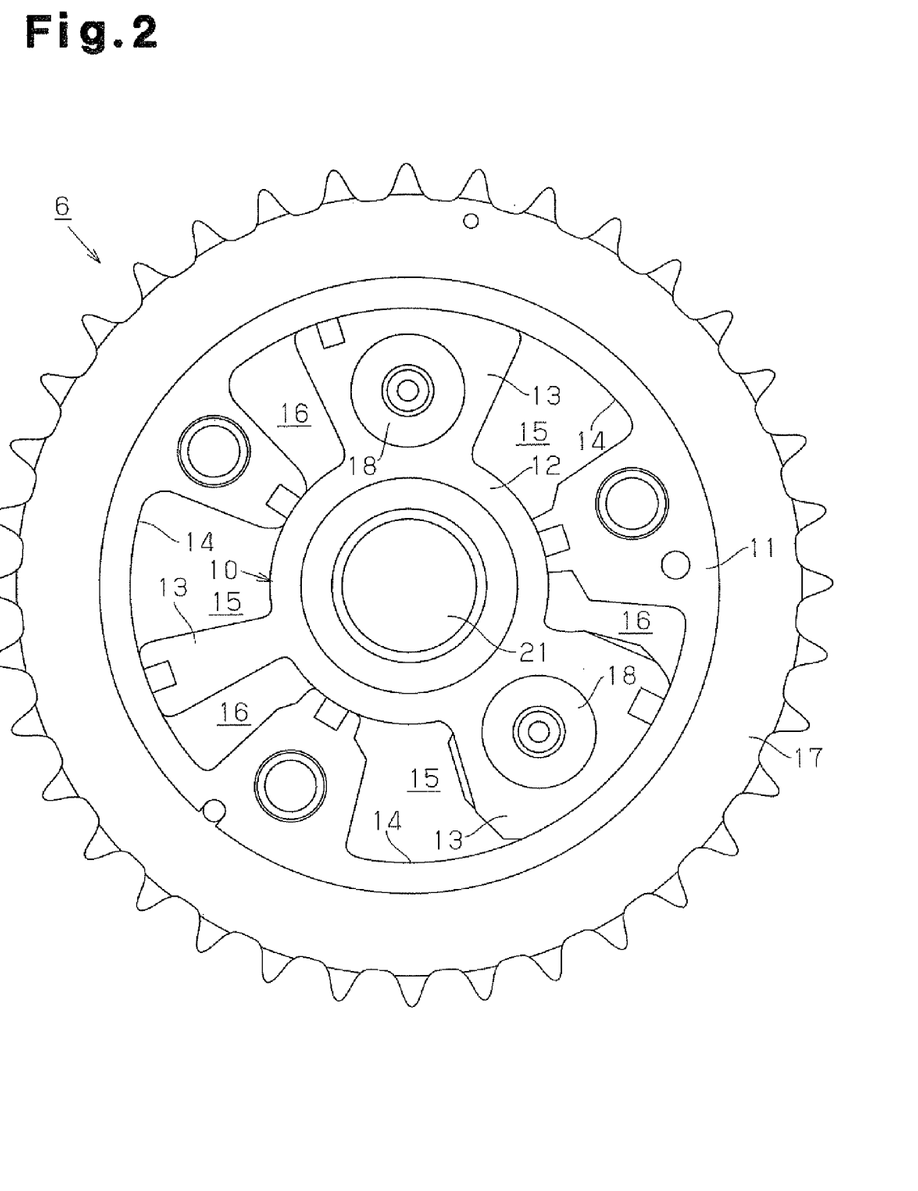
FIG. 2 is a front view showing the front structure in a state in which a variable valve timing mechanism applied to the embodiment is uncovered.

FIG. 2 shows a configuration of the VVT mechanism 6 applied to the present embodiment. The VVT mechanism 6 makes the valve timing of the intake valve 20 variable. FIG. 2 shows a front structure of the VVT mechanism 6 from which a cover has been removed. As shown in FIG. 2, the VVT mechanism 6 is equipped with two bodies of rotation of a vane rotor 10 and a housing 11.

The vane rotor 10 includes a substantially cylindrical rotor main body 12 and a plurality of vanes 13 (three in FIG. 2) protruding from an outer periphery of the rotor main body 12 in a radial direction. The vane rotor 10 is integrally rotatably fixed to a distal end of a cam shaft 21 of the internal combustion engine.

On the other hand, a housing 11 is formed to have a substantially annular shape and houses the vanes 13 in the inner periphery of the housing 11, and includes recessed portions 14 the number of which is equal to that of the vanes 13. The interior of the recessed portion 14 is partitioned into two oil chambers by the vane 13 housed in the recessed portion 14. Of these parts, the oil chamber formed on a rotating direction side of the cam shaft 21 with reference to the vane 13 serves as a retarding oil chamber 15, in which hydraulic pressure is introduced to relatively pivot the vane rotor 10 in the reverse rotational direction of the cam shaft 21 with reference to the housing 11. The oil chamber formed in the reverse rotational direction of the cam shaft 21 with reference to the vane 13 serves as an advancing oil chamber 16, in which hydraulic pressure introduced to relatively pivot the vane rotor 10 in a rotational direction of the cam shaft 21 with reference to the housing 11. The housing 11 is integrally rotatably fixed to a cam sprocket 17, has the same axis as that of the vane rotor 10, and can be relatively pivoted.

In such a variable valve mechanism, pressurized oil is introduced into the retarding oil chamber 15, and the pressurized oil is discharged from the advancing oil chamber 16. In this case, the vane rotor 10 is relatively pivoted in the rotational direction of the cam shaft 21 by an oil pressure difference acting on opposite sides of the vane 13 with reference to the housing 11. In this manner, the rotational phase of the cam shaft 21, which is integrally rotatably fixed to the vane rotor 10, is retarded, and the valve timing of the intake valve 20 driven to be opened and closed by a cam formed on the cam shaft 21 is retarded.

On the other hand, pressurized oil is introduced into the advancing oil chamber 16, and the pressurized oil is discharged from the retarding oil chamber 15. In this case, the vane rotor 10 is relatively pivoted in the rotational direction of the cam shaft 21 with reference to the housing 11. In this manner, the rotational phase of the cam shaft 21, which is integrally rotatably fixed to the vane rotor 10, is advanced, and the valve timing of the intake valve 20 driven to be opened/closed by the cam formed on the cam shaft 21 is advanced.

Intermediate lock mechanisms 18 are arranged on two of the vanes 13 of the variable valve mechanism. The intermediate lock mechanisms 18, depending on the operation thereof, mechanically lock the vane rotor 10 and the housing 11 to integrally rotate the vane rotor 10 and the housing 11. In the variable valve mechanism, at an intermediate lock position located at an intermediate between the most retarded position and the most advanced position, locking between the vane rotor 10 and the housing 11 is performed by the intermediate lock mechanism 18. The most retarded position refers to an operation position of the vane rotor 10 when the vane rotor 10 is maximally relatively pivoted in the reverse rotating direction of the cam shaft 21 with reference to the housing 11, and the most advanced position refers to an operation position of the vane rotor 10 when the vane rotor 10 is maximally relatively rotated in the rotating direction of the cam shaft 21.

The operation position of the vane rotor 10 in the VVT mechanism 6 is detected by a valve timing sensor 19 (see FIG. 1). A detection signal of the valve timing sensor 19 is input to the engine control computer 1.

Figure 3:
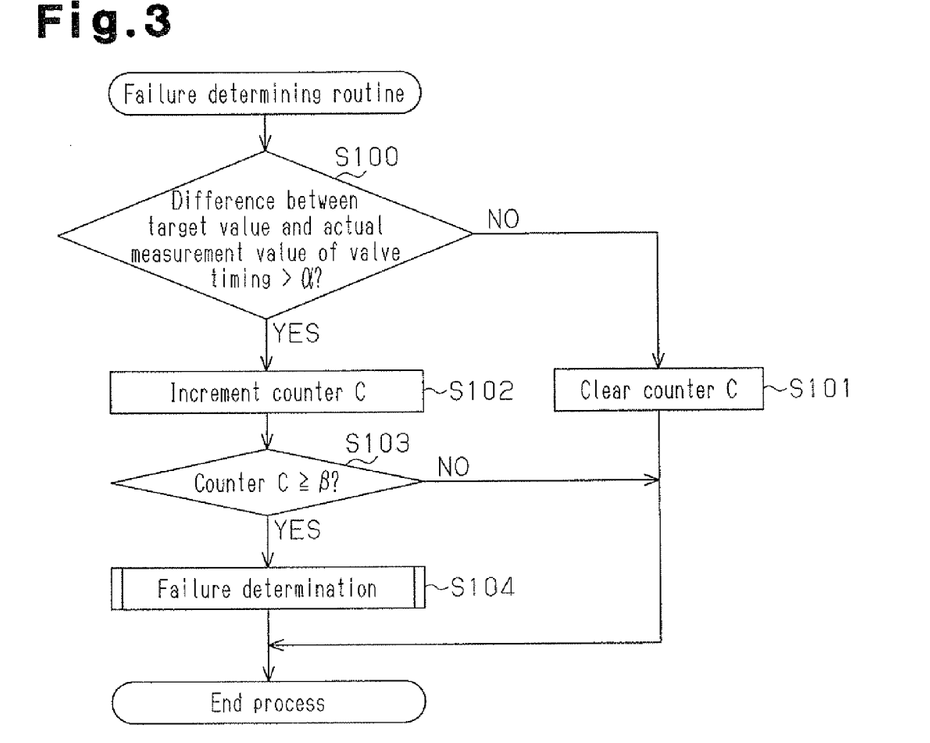
FIG. 3 is a flowchart showing a procedure for a failure determination routine applied to the embodiment.

In the control apparatus for an internal combustion engine configured as described above, the engine control computer 1 monitors the presence/absence of occurrence of a failure (breakdown) of the VVT mechanism 6 during engine operation. The failure is monitored through a process of a failure determining routine as shown in FIG. 3. The process of the failure determining routine is repeatedly executed each predetermined control period by the engine control computer 1 during engine operation.

When the process of the failure determining routine is started, first, it is determined in step S100 whether the difference of a target value and the actual measurement value of the valve timing is greater than a determination value $\alpha$. When the difference between the target value and the actual measurement value is less than or equal to the determination value $\alpha$ (S100: NO), in step S101, after a value of a counter C is cleared, the process of the routine at this time is ended. The cleared value of the counter C indicates a duration in which the difference between the target value and the actual measurement value exceeds the determination value $\alpha$.

On the other hand, when the difference between the target value and the actual measurement value exceeds the determination value $\alpha$ (S100: YES), the process shifts to step S102. When the process shifts to step S102, in step S102, the value of the counter C is incremented. In the subsequent step S103, it is determined whether the value of the counter C is greater than or equal to a specific failure determination value $\beta$. When the value of the counter C is smaller than the failure determination value $\beta$ (S103: NO), the process of the routine at this time is ended without performing any operation. On the other hand, when the value of the counter C is greater than or equal to the failure determination value β (S103: YES), the process shifts to step S104. After the failure determination is made in step S104, the routine at this time is ended.

When the failure determination is made, the engine control computer 1 transmits a VVT failure signal that notifies the VVT mechanism 6 that a failure has occurred in the IIS system 2. The IIS system 2 inhibits an idling stop depending on reception of the VVT failure signal.

Figure 4:
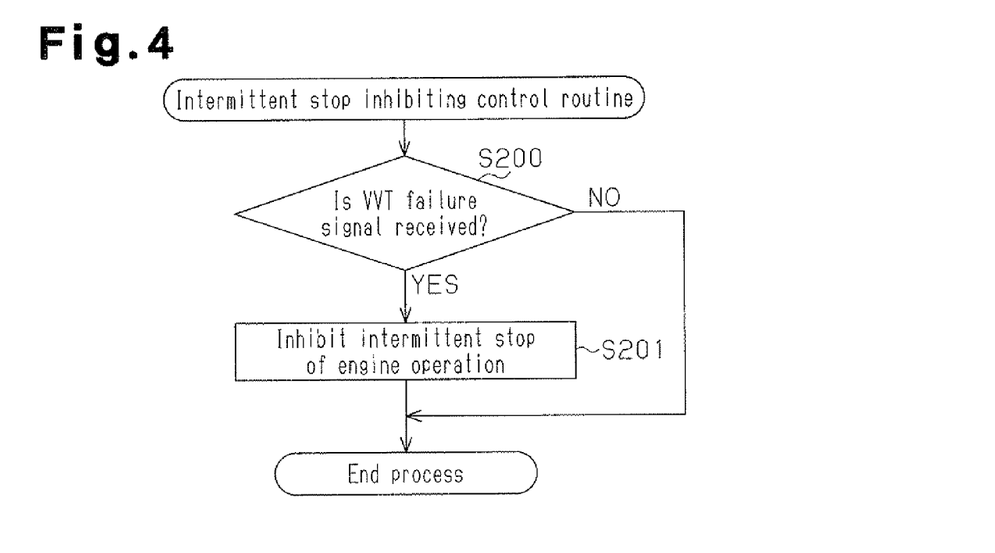
FIG. 4 is a flowchart showing a procedure for an intermittent stop inhibiting control routine applied to the embodiment.

FIG. 4 shows a flowchart of an intermittent stop inhibiting control routine according to inhibition such an idling stop. A process of the routine is repeatedly executed by the IIS system 2 every specific control period.

When the routine is started, first, it is determined in step S200 whether a VVT failure signal is received. When the VVT failure signal is not received (S200: NO), the process of the routine at this time is ended. On the other hand, when the VVT failure signal is received (S200: YES), the process shifts to step S201. In the step S201, after the engine operation is inhibited from being intermittently stopped by idling stop control, the process of the routine at this time is ended.

In the present embodiment, the IIS system 2 corresponds to an inhibiting means (inhibiting unit).

According to the control apparatus for an internal combustion engine of the present embodiment described above, the following advantage is obtained.

(1) In the present embodiment, the IIS system 2 inhibits the engine operation from being intermittently stopped by idling stop control at the occurrence of a failure in the VVT mechanism 6. When the failure occurs in the VVT mechanism 6, the valve timing is retarded with respect to the intermediate lock position at a restart of the internal combustion engine after the intermittent stop. In this case, a sufficient compression ratio cannot be obtained, and the internal combustion engine may be difficult to be restarted. In this regard, in the present embodiment, at the occurrence of a failure in the VVT mechanism 6, the engine operation is inhibited from being intermittently stopped by idling stop control. For this reason, the internal combustion engine can be avoided from being prevented from being restarted after an intermittent stop due to the occurrence of a failure in the VVT mechanism 6 having the intermediate lock mechanism 18.

Second Embodiment

A control apparatus for an internal combustion engine according to a second embodiment of to the present invention will be described below with reference to FIG. 5. The same reference numerals as in the present embodiment and embodiments described below denote the same parts in the present embodiment described above, and a description thereof will be omitted.

When a failure occurs in the VVT mechanism 6, the valve timing may be retarded with respect to the intermediate lock position at a restart of the internal combustion engine after an intermittent stop. In this case, a sufficient compression ratio cannot be obtained, and the internal combustion engine may be difficult to be restarted. For this reason, in the present embodiment, the engine control computer 1 monitors for the presence/absence of failure occurrence in the VVT mechanism 6 to limit the operation range of the VVT mechanism 6 to the range of the retarded side with respect to the intermediate lock position. The engine control computer 1 transmits a VVT failure signal to the IIS system 2 at the occurrence of a failure, and the engine operation is inhibited from being intermittently stopped by idling stop control.

Figure 5:
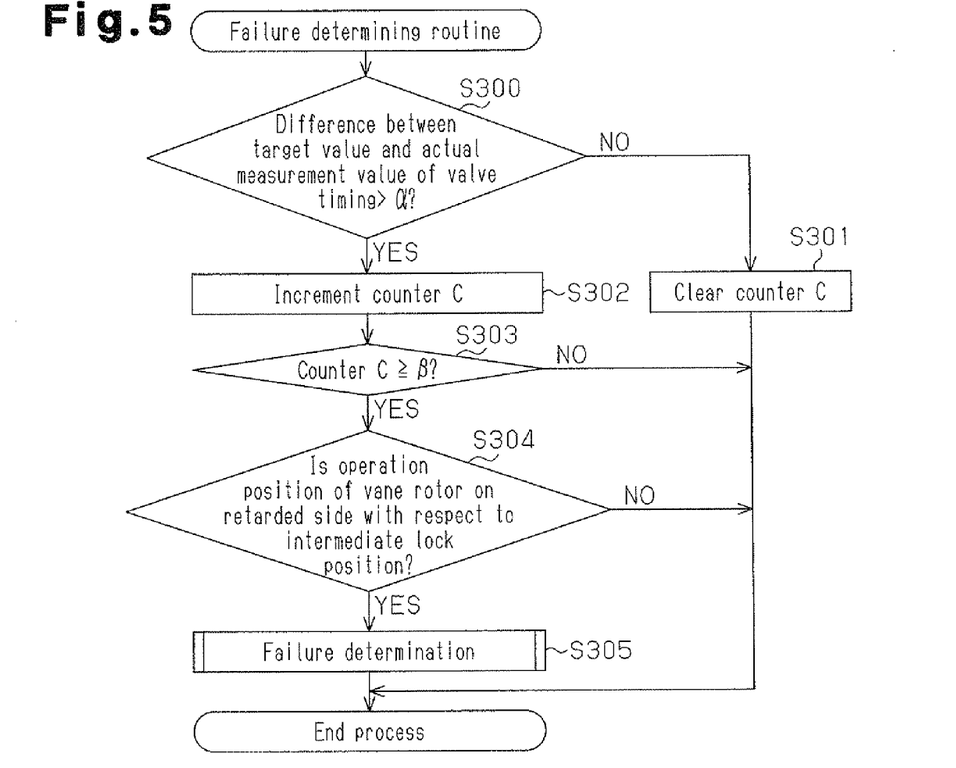
FIG. 5 is a flowchart showing a procedure for a failure determination routine applied to a second embodiment of the present invention.

FIG. 5 shows a procedure for a failure determining routine applied to the above embodiment. The process for the failure determining routine is repeatedly executed each predetermined control period by the engine control computer 1 during engine operation.

When the routine is started, in step 300, it is determined whether the difference between a target value and the actual measurement value of the valve timing is greater than the determination value α. When the difference between the target value and the actual measurement value is less than or equal to the determination value α (S300: NO), in step S301, after a value of the counter C is cleared, the process for the routine at this time is ended.

On the other hand, when the difference between the target value and the actual measurement value exceeds the determination value α (S300: YES), the process shifts to step S302. When the process shifts to step S302, in step S302, the value of the counter C is incremented, and it is determined in the subsequent step S303 whether the value of the counter C is greater than or equal a specific failure determination value β. When the value of the counter C is smaller than the specific failure determination value β (S103: NO), the process for the routine at this time is ended without performing any operation.

On the other hand, in the present embodiment, when the value of the counter C is greater than or equal to the failure determination value β (S303: YES), the process shifts to step S304, and it is determined in step S304 whether a present valve timing, i.e., the operation position of the vane rotor 10 is retarded with respect to the intermediate lock position. When the operation position of the vane rotor 10 is advanced with respect to the intermediate lock position (S304: NO), the process of the routine is ended without making a failure determination. In the present embodiment, only when the operation position of the vane rotor 10 is retarded with respect to the intermediate lock position (S304: YES), the process shifts to step S305, and a failure determination is made in step S305. When the failure determination is made, a VVT failure signal is transmitted from the engine control computer 1 to the IIS system 2, and the engine operation is inhibited from being intermittently stopped by idling stoppage in response to the reception.

According to the control apparatus for an internal combustion engine of the present embodiment described above, the following advantage can be obtained.

(2) In the present embodiment, the IIS system 2 inhibits the internal combustion engine from being intermittently stopped when a failure of the VVT mechanism 6 occurs to limit the operation range of the VVT mechanism 6 to a range on a retarded side with respect to the intermediate lock position. For this reason, the internal combustion engine can be avoided from being prevented from being restarted after an intermittent stop due to occurrence of a failure in the VVT mechanism 6 with the intermediate lock mechanism 18.

Third Embodiment

Subsequently, a control apparatus for an internal combustion engine according to a third embodiment of the present invention will be described below with reference to FIG. 6. In the present embodiment, when a failure of the VVT mechanism 6 occurs, the type of the failure is specified. The type of failure is specified on the basis of the operation position (valve timing) of the vane rotor 10 at the occurrence of the failure, and changes in valve timings until the failure occurs. For example, when the operation position of the vane rotor 10 does not move from an intermediate lock position at all, the type of the failure is identified at that time an unlocking failure of the intermediate lock mechanism 18. When the type of failure is specified, the engine control computer 1 transmits the VVT failure signal to the IIS system 2 together with a signal representing the type of failure.

In the present embodiment, the IIS system 2 selects whether to inhibit the engine operation form being intermittently stopped by idling stop control depending on the type of failure. More specifically, when the type of failure is an unlocking failure of the intermediate lock mechanism 18, the IIS system 2 does not inhibit the engine operation from being intermittently stopped. When the type of failure is not an unlocking failure, the IIS system 2 inhibits the engine operation from being intermittently stopped. In this manner, in the present embodiment, at the occurrence of a failure of the VVT mechanism 6, when good engine restartability is exhibited, the engine operation is not inhibited from being intermittently stopped by idling stop control.

Figure 6:
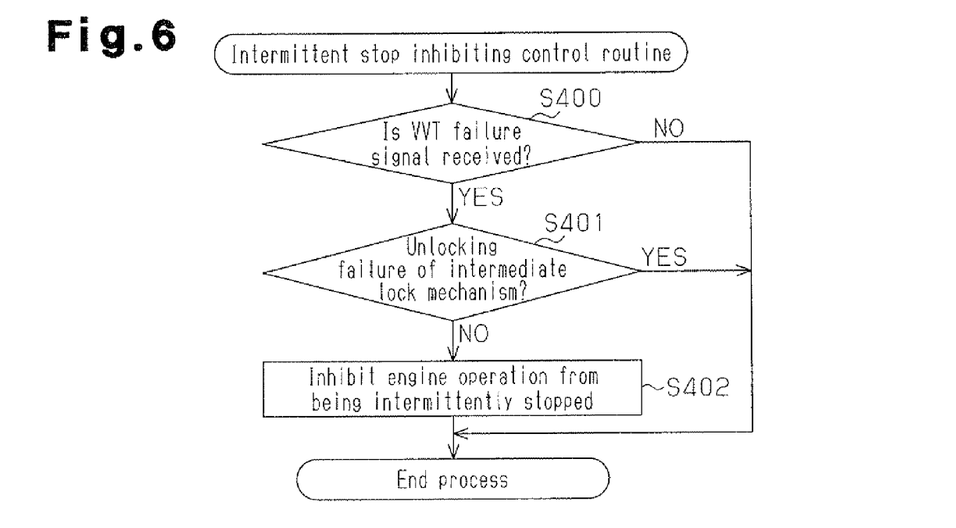
FIG. 6 is a flowchart showing a procedure for an intermittent stop inhibiting control routine applied to a third embodiment of the present invention.

FIG. 6 shows a flowchart of an intermittent stop inhibiting control routine applied to the present embodiment. The process of the routine is repeatedly executed each specific control period by the IIS system 2.

When the routine is started, in step S400, it is determined whether a VVT failure signal is received. When the VVT failure signal is not received (S400: NO), the process of the routine at this time is ended without performing any operation. On the other hand, when the VVT failure signal is received (S400: YES), the process shifts to step S401.

When the process shifts to step S401, in step S401, it is determined whether the failure of the VVT mechanism 6 at this time is an unlocking failure of the intermediate lock mechanism 18. In this case, when the type of failure of the VVT mechanism 6 is not an unlocking failure of the intermediate lock mechanism 18 (S401: NO), in step S402, after the engine operation is inhibited from being intermittently stopped by idling stop control, the process for the routine at this time is ended. On the other hand, when the type of the failure of the VVT mechanism 6 is an unlocking failure of the intermediate lock mechanism 18 (S401: YES), regardless of the occurrence of the failure, the process for the routine at this time is ended without inhibiting the engine operation from being intermittently stopped by the idling stop control.

According to the control apparatus of the internal combustion engine for the present embodiment described above, the following advantage can be obtained.

(3) In the present embodiment, the IIS system 2 selects whether to inhibit the internal combustion engine from being intermittently stopped depending on the type of failure at the occurrence of the failure of the VVT mechanism 6. More specifically, at the occurrence of a failure, if the failure is an unlocking failure of the intermediate lock mechanism 18, the IIS system 2 does not inhibit the engine operation from being intermittently stopped by idling stop control. For this reason, in the present embodiment, the engine operation is not unnecessarily inhibited from being intermittently stopped, and effective improvement of the fuel efficiency by executing intermittent stopping can be maintained.

Fourth Embodiment

Next, a control apparatus for an internal combustion engine according to a fourth embodiment of the present invention will be described below with reference to FIG. 7.

When a failure of the VVT mechanism 6 occurs, an internal combustion engine may exhibit good startability depending on the engine operation situation at the time. For example, when the engine temperature is sufficiently high, the temperature of the engine lubricating oil is also high, and rotational resistance of the internal combustion engine is low. For this reason, even though the valve timing is retarded with respect to an intermediate lock position, the internal combustion engine can exhibit good startability.

Therefore, in the present embodiment, at the occurrence of a failure, a selection is made depending on the engine operational situation at the time of whether engine operation is inhibited from being intermittently stopped. More specifically, the IIS system 2 according to the present embodiment refers to an engine coolant temperature as an index value for the engine temperature. When the engine coolant temperature is higher than a specific determination value $\gamma$, the engine operation is not inhibited from being intermittently stopped by idling stop control when a failure of the VVT mechanism 6 occurs. As described above, even in the present embodiment, when good engine restartability is exhibited at the occurrence of the failure of the VVT mechanism 6, engine operation is not inhibited from being intermittently stopped by the idling stop control. As the determination value $\gamma$, a temperature higher than a minimum temperature of an engine coolant temperature at which the engine operation is permitted to be intermittently stopped by idling stop control is set.

Figure 7:
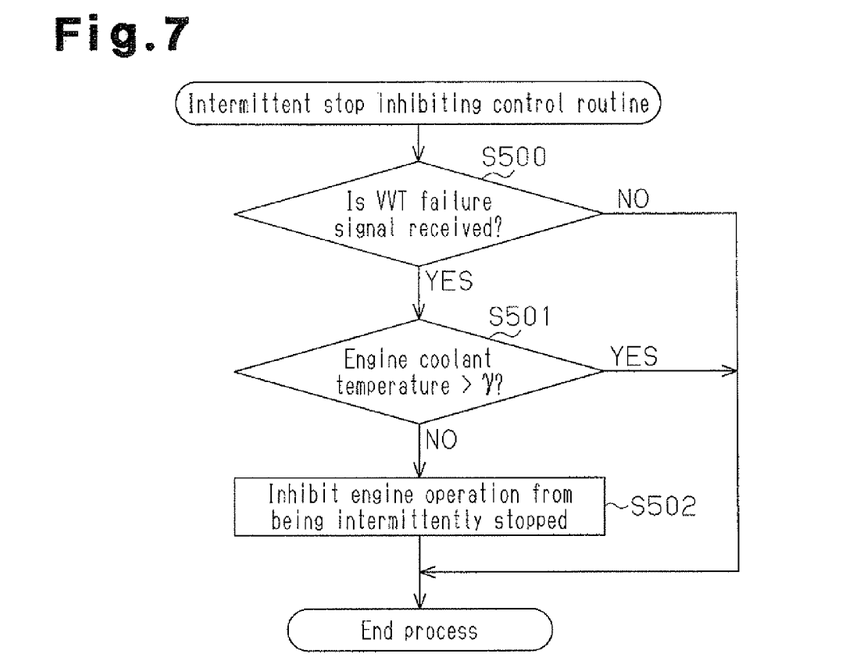
FIG. 7 is a flowchart showing a procedure for an intermittent stop inhibiting control routine applied to a fourth embodiment of the present invention.

FIG. 7 is a flowchart of an intermittent stop inhibiting control routine applied to the present embodiment. The process of the routine is repeatedly executed each specific control period by the IIS system 2.

When the routine is started, it is determined in step S500 whether a VVT failure signal is received. In this case, when the VVT failure signal is not received (S500: NO), the routine at this time is ended without performing any operation. On the other hand, when the VVT failure signal is received (S500: YES), the process shifts to step S501.

When the process shifts to step S501, in step S501, it is determined whether an engine coolant temperature is higher than the determination value $\gamma$. When the engine coolant temperature is lower than or equal to the determination value $\gamma$ (S501: NO), in step S502, after the engine operation is inhibited from being intermittently stopped by idling stop control, the process of the routine at this time is ended. On the other hand, when the engine coolant temperature is higher than the determination value $\gamma$ (S501: YES), regardless of occurrence of a failure, the process of the routine at this time is ended without inhibiting the engine operation from being intermittently stopped by the idling stop control.

According to the control apparatus for an internal combustion engine of the present embodiment described above, the following advantage can be obtained.

(4) When a failure of the variable valve timing mechanism occurs, the internal combustion engine may exhibit good startability, depending on the engine operational situation at the time. For example, when the engine temperature is sufficiently high, even though the valve timing is retarded with respect to the intermediate lock position, the internal combustion engine can exhibit good startability. In this regard, in the present embodiment, the IIS system 2 selects whether to inhibit the engine operation from being intermittently stopped depending on the engine operational situation at the time when a failure of the VVT mechanism 6 occurs. More specifically, the IIS system 2 does not inhibit the engine operation from being intermittently stopped when an engine coolant temperature is higher than the determination value $\gamma$ at the occurrence of the failure of the VVT mechanism 6. For this reason, in the control apparatus for an internal combustion engine according to the present embodiment, the engine operation is not unnecessarily inhibited from being intermittently stopped, and effective improvement of fuel efficiency by executing intermittent stopping is able to be maintained.

Fifth Embodiment

Next, a control apparatus for an internal combustion engine according to a fifth embodiment of the present invention will be described below with reference to FIG. 8.

When the engine temperature rises to some extent as described above, the internal combustion engine can exhibit good startability even when a failure of the VVT mechanism 6 occurs. On the other hand, the engine temperature can be estimated to some extent from an elapsed time after the engine starts. Therefore, in the present embodiment, when the IIS system 2 determines that the engine temperature rises to exhibit good startability even at the occurrence of a failure of the VVT mechanism 6 when the elapsed time after the engine starts is a specific time $\epsilon$. The IIS system 2 according to the present embodiment inhibits the engine operation from being intermittently stopped by idling stop control until the elapsed time after the engine starts reaches the specific time $\epsilon$ when a failure of the VVT mechanism 6 occurs.

Figure 8:
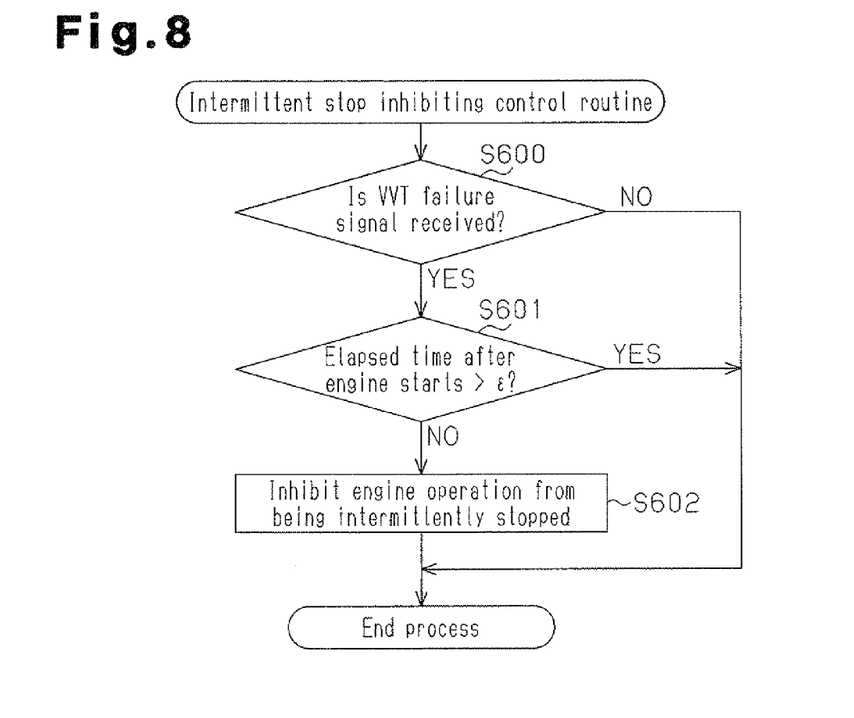
FIG. 8 is a flowchart showing a procedure for an intermittent stop inhibiting control routine applied to a fifth embodiment of the present invention.

FIG. 8 is a flowchart of an intermittent stop inhibiting control routine applied to the present embodiment. The process of the routine is repeatedly executed each specific control period by the IIS system 2.

When the routine is started, in step S600, it is determined whether a VVT failure signal is received. When the VVT failure signal is not received (S600: NO), the process for the routine at the time is ended without performing any operation. On the other hand, when the VVT failure signal is received (S600: YES), the process shifts to step S601.

When the process shifts to step S601, in step S601, it is determined whether the elapsed time after the engine starts is equal to or longer than the specific time $\epsilon$. In this case, when the elapsed time after the engine starts is shorter than "$\epsilon$" (S601: NO), in step S602, after the engine operation is inhibited from being intermittently stopped by idling stop control, the process of the routine at the time is ended. On the other hand, when the elapsed time after the engine starts is "$\epsilon$" or longer (S601: YES), regardless of the occurrence of the failure, the process of the routine at the time is ended without inhibiting the engine operation from being intermittently stopped by the idling stop control.

According to the control apparatus for the internal combustion engine of the present embodiment described above, the following advantage can be obtained.

(5) Even at the occurrence of a failure of the VVT mechanism 6, when a sufficient time has elapsed after the engine starts to cause the internal combustion engine to sufficiently warm up, even though the valve timing is retarded with respect to the intermediate lock position, the internal combustion engine can exhibit good startability. For this reason, in the present embodiment, the IIS system 2 inhibits the engine operation from being intermittently stopped by idling stop control in response to the failure of the VVT mechanism 6 until the elapsed time after the engine starts reaches the specific time. For this reason, according to the present embodiment, engine operation is not unnecessarily inhibited from being intermittently stopped, and effective improvement of the fuel efficiency by executing intermittent stopping is able to be maintained.

The embodiments described above can also be modified as follows.

In the third embodiment, when the type of a failure of the VVT mechanism 6 is an unlocking failure of the intermediate lock mechanism 18, the engine operation is not inhibited from being intermittently stopped. However, in addition to this, when good startability can be exhibited at the occurrence of some failure, engine operation does not need to be inhibited from being intermittently stopped at the occurrence of the failure.

In the fourth embodiment, although an engine coolant temperature is used as an index value for the engine temperature, the temperature of the engine lubricating oil may also be used as the index value to select whether to inhibit engine operation from being intermittently stopped by idling stop control.

In the fourth embodiment, the engine operation is not inhibited from being intermittently stopped even at the occurrence of a failure of the VVT mechanism 6 when the engine temperature is high. However, in addition to this, when good startability can be exhibited even at the occurrence of some failure, the engine operation does not need to be inhibited from being intermittently stopped at the occurrence of a failure.

In the third embodiment, it is selected depending on the type of a failure whether to inhibit the engine operation from being intermittently stopped. In the fourth embodiment, it is selected depending on the engine operation status whether to inhibit the engine operation from being intermittently stopped. The IIS system 2 may be configured to perform both the operation of selecting whether the engine operation is inhibited from being intermittently stopped depending on the type of failure and the operation of selecting whether the engine operation is inhibited from being intermittently stopped depending on the engine operation status. In this case, at the occurrence of a failure of the VVT mechanism 6, for example, both when the type of the failure is an unlocking failure of the intermediate lock mechanism 18 and when the engine temperature is high, the engine operation is not inhibited from being intermittently stopped.

In the above illustrated embodiments, a failure signal is output depending on a determination of a failure, and the engine operation is inhibited from being intermittently stopped by receiving the failure signal. In contrast to this, a normal signal is output in a normal state as well as the engine operation is permitted to be intermittently stopped on the basis of the reception of the normal signal, and is not output in case of failure as well as the engine operation is not permitted to be intermittently stopped on the basis of the absence of an input of the normal signal. In this manner, the same control as described above can be performed.

The above embodiments each describe a case in which the engine operation is intermittently stopped by idling stop control. However, in a hybrid vehicle, an internal combustion engine may be intermittently stopped in response to motor driving. A process related to the inhibition of an intermittent stop in the above embodiments may also be applied to an intermittent stop of the engine operation in the hybrid vehicle. In such a case, the internal combustion engine can be avoided from being prevented from being restarted after an intermittent stop due to occurrence of a failure of the VVT mechanism 6 with the intermediate lock mechanism 18.

DESCRIPTION OF THE REFERENCE NUMERALS

1 . . . Engine control computer, 2 . . . IIS system (inhibiting means), 3 . . . Crank position sensor, 4 . . . Shift position sensor, 5 . . . Coolant temperature sensor, 6 . . . VVT mechanism, 7 . . . Wheel speed sensor, 8 . . . G sensor, 9 . . . Brake sensor, 10 . . . Vane rotor, 11 . . . Housing, 12 . . . Rotor main body, 13 . . . Vane, 14 . . . Recessed portion, 15 . . . Retarding oil chamber, 16 . . . Advancing oil chamber, 17 . . . Cam sprocket, 18 . . . Intermediate lock mechanism, 19 . . . Valve timing sensor, 20 . . . Accelerator sensor

The invention claimed is:

1. A control apparatus for an internal combustion engine, the apparatus being applied to an internal combustion engine having a variable valve timing mechanism that makes valve timing of an engine valve variable and has an intermediate lock mechanism that mechanically locks the valve timing at an intermediate lock position excluding a most retarded position and a most advanced position, the apparatus intermittently stopping operation of the engine,
wherein the apparatus does not execute an intermittent stopping when the operation range of the variable valve timing mechanism is limited to a range on a retarded side with respect to the intermediate lock position.

2. The control apparatus for an internal combustion engine according to claim 1, wherein even in case the operation range of the variable valve timing mechanism is limited to the range on the retarded side with respect to the intermediate lock position, the apparatus executes the intermittent stopping when engine restartability is exhibited.

3. The control apparatus for an internal combustion engine according to claim 1, wherein even in case the operation range of the variable valve timing mechanism is limited to the range on the retarded side with respect to the intermediate lock position, the apparatus executes the intermittent stopping depending on the type of failure, which causes the operation range being limited.

4. The control apparatus for an internal combustion engine according to claim 1, wherein even in case the operation range of the variable valve timing mechanism is limited to the range on the retarded side with respect to the intermediate lock position, the apparatus executes the intermittent stopping depending on the engine operation status at the time.

5. The control apparatus for an internal combustion engine according to claim 1, wherein even in case the operation range of the variable valve timing mechanism is limited to the range on the retarded side with respect to the intermediate lock position, the apparatus executes the intermittent stopping when the operation range being limited is caused by an unlocking failure of the intermediate lock mechanism.

6. The control apparatus for an internal combustion engine according to claim 1, wherein even in case the operation range of the variable valve timing mechanism is limited to the range on the retarded side with respect to the intermediate lock position, the apparatus executes the intermittent stopping when the engine temperature is higher than a specific determination value.

7. The control apparatus for an internal combustion engine according to claim 6, wherein as the determination value, a temperature is set that is higher than a minimum value of an engine temperature at which the intermittent stop is permitted to be executed.

8. The control apparatus for an internal combustion engine according to claim 1, wherein the apparatus does not execute the intermittent stopping until an elapsed time after the engine starts reaches a specific time.

* * * * *